United States Patent
Malloy et al.

(10) Patent No.: US 9,088,481 B2
(45) Date of Patent: *Jul. 21, 2015

(54) WEB TRANSACTION ANALYSIS

(71) Applicant: Riverbed Technology, Inc., San Francisco, CA (US)

(72) Inventors: Patrick J. Malloy, Washington, DC (US); Seth Martin, Washington, DC (US); Alex Chernyakov, Bethesda, MD (US); Jerome Plun, Alexandria, VA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,124

(22) Filed: Jan. 7, 2014

(65) Prior Publication Data

US 2014/0122712 A1 May 1, 2014

Related U.S. Application Data

(63) Continuation of application No. 12/963,481, filed on Dec. 8, 2010, now Pat. No. 8,635,334.

(60) Provisional application No. 61/285,409, filed on Dec. 10, 2009, provisional application No. 61/393,709, filed on Oct. 15, 2010.

(51) Int. Cl.
    *G06F 15/173* (2006.01)
    *H04L 12/26* (2006.01)
    *G06F 11/34* (2006.01)

(52) U.S. Cl.
    CPC ............ *H04L 43/04* (2013.01); *G06F 11/3409* (2013.01); *H04L 43/026* (2013.01); *G06F 11/3466* (2013.01); *G06F 2201/87* (2013.01); *G06F 2201/875* (2013.01); *H04L 43/045* (2013.01); *H04L 43/0888* (2013.01)

(58) Field of Classification Search
    USPC .......................................... 709/223–224, 217
    See application file for complete search history.

(56) References Cited

U.S. PATENT DOCUMENTS

| 8,635,334 B2 * | 1/2014 | Malloy et al. ................. 709/224 |
| 2002/0103896 A1 * | 8/2002 | von Klopp Lemon ........ 709/224 |
| 2005/0027820 A1 * | 2/2005 | O'Laughlen et al. ......... 709/217 |
| 2009/0216882 A1 * | 8/2009 | Britton et al. ................. 709/224 |

* cited by examiner

Primary Examiner — Philip B Tran
(74) Attorney, Agent, or Firm — Park, Vaughan, Fleming & Dowler LLP

(57) ABSTRACT

Individual network activities are correlated to interactions with a target web page to facilitate an analysis of the performance of the web page. This correlation is preferably performed using a combination of heuristics and rules developed to filter network activities into those activities that are likely to have been caused by the particular transaction, and those that are unlikely to be associated with that transaction. The activities that are identified as being associated with the transaction are subsequently organized to identify a time-flow of these activities within the transaction, from which performance statistics can be determined and presented to a user. Because the individual activities within the transaction are identified and time-ordered, an analysis of the effects of each activity on the overall performance of the web page can be performed to identify potential problem areas, or to diagnose reported problems.

20 Claims, 3 Drawing Sheets

| Group | # of Page Views | Page View Rate [#/min] | % Slow Pages | % HTTP 400s | Page Size in KB | Page Time in Sec. |
|---|---|---|---|---|---|---|
| Other Web Application | 1512 | 25.200 | 2.861 | 1.743 | 23.556 | 2.673 |
| ⊞ Server IPs | | | | | | |
| ⊞ Client IPs | | | | | | |
| ⊞ Originating IPs | | | | | | |
| ⊞ Users  510 | | | | | | |
| ⊟ Page Families | | 530 | 540 | 550 | 560 | 570 |
| ⊞ http://www.washingtonpost.com/wp_dy... | 520  234 | 3.966 | 0 | 0 | 0.362 | 0.037 |
| ⊞ http://news.yahoo.com/s/ap/20091007/ | 217 | 3.617 | 0 | 0 | 208.274 | 2.998 |
| ⊞ http://mail.google.com/ | 149 | 2.483 | 0 | 0 | 105.328 | 1.434 |
| ⊞ http://www.youtube.com/ | 114 | 1.900 | 0 | 0 | 418.883 | 3.979 |
| ⊟ http://www.cnn.com/2009/US/10/07/ | 111 | 1.881 | 21.622 | 1.261 | 305.570 | 3.275 |
| ⊞ Server IPs | | | | | | |
| ⊞ Client IPs | | | | | | |
| ⊞ Originating IPs | | | | | | |
| ⊞ Users | | | | | | |
| ⊞ http://www.facebook.com/ | 87 | 1.450 | 1.150 | 0 | 338.284 | 3.514 |

FIG. 5

WEB TRANSACTION ANALYSIS

This application is a Continuation of application Ser. No. 12/963,481, and claims the benefit of U.S. Provisional Patent Applications 61/285,409, filed 10 Dec. 2009, and 61/393,709 filed 15 Oct. 2010.

BACKGROUND AND SUMMARY OF THE INVENTION

This invention relates to the field of performance analysis, and in particular to a system and method for evaluating transactions associated with accessing and interacting with a web page.

The performance of a web page will have an impact on the number of visits to the page, as well as consumer satisfaction with the organization associated with the web page. If there is a noticeable delay while downloading a web page, the user may choose to terminate the access and browse a different web site. If the user must access this particular page, the user's frustration with web page access will affect the user's opinion of the organization associated with the web page. In like manner, if providing a web page is inefficient, the provider of the web page may have to invest in additional server equipment to counteract this inefficiency. Thus, there is a need on the part of the service provider and the web page provider to monitor transactions associated with access to their web pages.

Analyzing the performance of transactions on a web page, however, is not a straightforward task. Not only is the performance based on a variety of factors that are not related directly to the web page, such as the bandwidth, congestion, and load on the various links of the network between the web server and the client device, but also, the collection of meaningful information is hindered by the 'stateless' nature of web page access using such protocols as HTTP (Hypertext Transfer Protocol) and HTTPS (HTTP Secure).

Most web pages include a variety of elements, such as pictures, text, interactive buttons, and so on. HTML (Hypertext Markup Language) is generally used to construct the web page, as well as to identify or describe each of the individual elements. When the web page is downloaded to the client browser, the browser finds each of the HTML identifiers (generally, a URL (Universal Resource Locator) that identifies a location on the web at which the corresponding element is located), and initiates a download of the element from that location. These downloaded elements may also contain other HTML identifiers, and the browser iteratively downloads each of these subsequently identified elements.

From a network perspective, the downloading of the web page and each of the elements are substantially independent events. That is, the state of the overall downloading sequence is contained solely within the client browser, and not reflected in the individual downloads of these elements. A browser may choose, for example, not to download picture elements, even though the page, or included elements, may identify such picture elements. In like manner, the browser may at one time download a video clip, and at another time, download only an image of the clip, waiting for the user to select the image before performing the actual download of the clip. That is, knowing that a page contains particular elements does not, per se, define actions subsequent to the downloading of the page.

To evaluate the performance of a web page, one needs to determine which downloads (or other actions) are associated with the client browser's processing of that web page. However, because the relationships among those actions (i.e. states within the browser) are not apparent in the corresponding network communications, monitoring the network communications provides very little information regarding the actual performance of the web page. Accordingly, service providers and web page providers are effectively 'blind' to any potential problems, and are unable to perform effective analysis and diagnostics.

It would be advantageous to be able to evaluate the performance of a web page based on monitored network traffic. It would also be advantageous to be able to analyze and diagnose the performance of particular activities associated with interactions with elements of the web page.

These advantages, and others, can be realized by a processing method and system that correlates individual network activities corresponding to individual interactions with the web page. This correlation is preferably performed using a combination of heuristics and rules developed to filter network activities into those activities that are likely to have been caused by the particular transaction, and those that are unlikely to be associated with that transaction. The activities that are identified as being associated with the transaction are subsequently organized to identify a time-flow of these activities within the transaction, from which performance statistics can be determined and presented to a user. Because the individual activities within the transaction are identified and time-ordered, an analysis of the effects of each activity on the overall performance can be performed to identify potential problem areas, or to diagnose reported problems.

BRIEF DESCRIPTION OF THE DRAWINGS

The invention is explained in further detail, and by way of example, with reference to the accompanying drawings wherein:

FIG. 5 illustrates an example performance analysis presentation screen.

Throughout the drawings, the same reference numerals indicate similar or corresponding features or functions. The drawings are included for illustrative purposes and are not intended to limit the scope of the invention.

DETAILED DESCRIPTION

Figure 1:
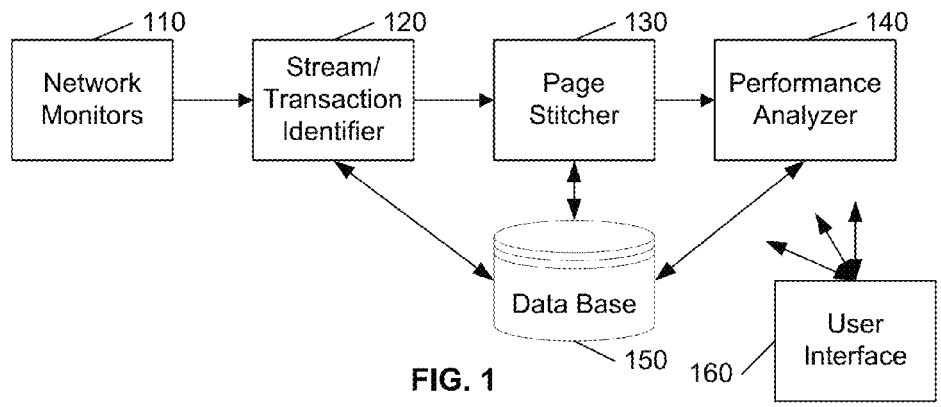
FIG. 1 illustrates an example block diagram of a web transaction analysis system.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Also, for ease of reference, terms such as 'packet' or 'message' are used in the general sense to identify elements that are transmitted from one point to another, and do not connote any particular structure or format. In like manner, terms such as 'stored in the trace file' or 'stored in a data base' include the storage of a pointer to information at another location; that is, any material that can be retrieved based on information contained in the trace file or data base is considered to be stored in the trace file or data base. Similarly, the terms 'file' and 'data base' are also used in the general sense, and may include multiple physical entities, such as used for storing distributed files and data bases. The 'trace file' may, for example, comprise a variety of individual trace files at different monitoring devices. The term 'object' is also used in the general sense to mean a collection of stored data or information, and does not necessarily imply or suggest the use of object oriented programming techniques.

In the following description, a hierarchy of 'transactions', or streams of communication, is presented. At a lowest level, a network transaction can be defined as a stream of related packets communicated between two or more entities. Such a transaction can be as simple at the sending of data from a first node to a second node, followed by an acknowledgment from the second node to the first node. A more complex network transaction can be a request for data from a first node to a second node, followed by an acknowledgement of receipt of the request to the first sender and a corresponding request for data from the second node to a third node, followed by an acknowledgement of receipt of the request from the third node to the second node, . . . followed eventually by receipt of the requested data by the first node and an acknowledgement from the first node, which ends the transaction.

At a next higher level, HTTP transactions correspond to streams of related HTTP messages, such as the transmission of an HTTP GET (Object) message from a first node, followed by receipt of the corresponding HTTP Object by the first node.

At a next higher level, Web transactions are defined herein as comprising related HTTP transactions. A Web transaction may correspond to one HTTP transaction, such as a request for download of an HTTP object that is 'self contained', such as a web-page that does not include other HTTP objects. A more complex Web transaction may be a request for an HTTP object that includes references to other HTTP objects, some of which may include references to further HTTP objects, and so on, such as a request for a web page that includes images, text, buttons, and so on. In this disclosure, the downloading of a web page is used as an example of a web transaction; however, one of skill in the art will recognize that other sets of related HTTP transactions may comprise a web transaction, such as composing and sending an e-mail within the context of a rendered page (e.g. GMail), asynchronous requests (AJAX), streaming data (stock streamer, security camera feed, etc.)

FIG. 1 illustrates an example block diagram of a web transaction analysis system in accordance with aspects of this invention, and provides an overview of the processes used to perform web transaction analysis. The operation of the web transaction analysis system is controlled via a user interface 160, and includes a database 150 for storing parameters and heuristics used by the various elements in the system, as well as for storing the results of the processing performed by the system, as detailed further below.

The web transaction analysis system includes, or is coupled to, devices 110 that monitor traffic on the network using techniques common in the art. The monitoring devices may include filters that are configured to capture traffic with particular attributes, such as traffic to or from particular sites. Typically, the monitoring devices will capture the header information associated with each transmission, as well as at least a portion of the communicated message; in particular, the monitoring devices are preferably configured to capture at least a portion of the message that includes the HTTP header/introductory information.

The captured traffic from the monitoring devices 110 is forwarded to a stream identifier 120 that is configured to identify transaction streams, including, for example, requests for data and the corresponding responses to these requests. USPA 2007/0047438, "IDENTIFYING A TRANSACTION OF INTEREST WITHIN A NETWORK" published 1 Mar. 2007 for Malloy et al. discloses techniques for tracing transactions within a plurality of communications, and is incorporated by reference herein. One of skill in the art will recognize that other techniques for identifying sequences of messages corresponding to a transaction may also be used.

A page stitcher 130 is configured to further filter the transactions identified by the stream identifier 120 to identify transactions related to one or more web pages of interest. The operation of this stitcher 130 is detailed below with respect to FIGS. 2-5, but as an overview, the stitcher 130 identifies transactions corresponding to an exchange of HTTP messages, hereinafter termed HTTP transactions, and determines which HTTP transactions are related to a given download of a web page. To minimize the amount of traffic to be processed, the stitcher 130 preferably includes a filter that identifies HTTP messages, and filters out those that are not expected to significantly affect the performance parameters associated with interacting with the web page. That is, for example, HTTP GET requests and corresponding HTTP responses are identified for processing, whereas HTTP Update requests will generally have no effect on the overall performance, and need not be processed by the web transaction analysis system.

Using the identified HTTP transactions, the page stitcher 130 identifies one or more pages of interest, then processes each subsequent HTTP transaction to determine whether the transaction is related to any of the identified pages of interest, is the start of a new page of interest, or is neither. The identified HTTP items include timing parameters that facilitate analysis by the performance analyzer 140.

The performance analyzer 140 determines a variety of statistics associated with each page of interest, including such items as page size, download time, number of downloads, number of incomplete downloads, and so on.

Figure 2:
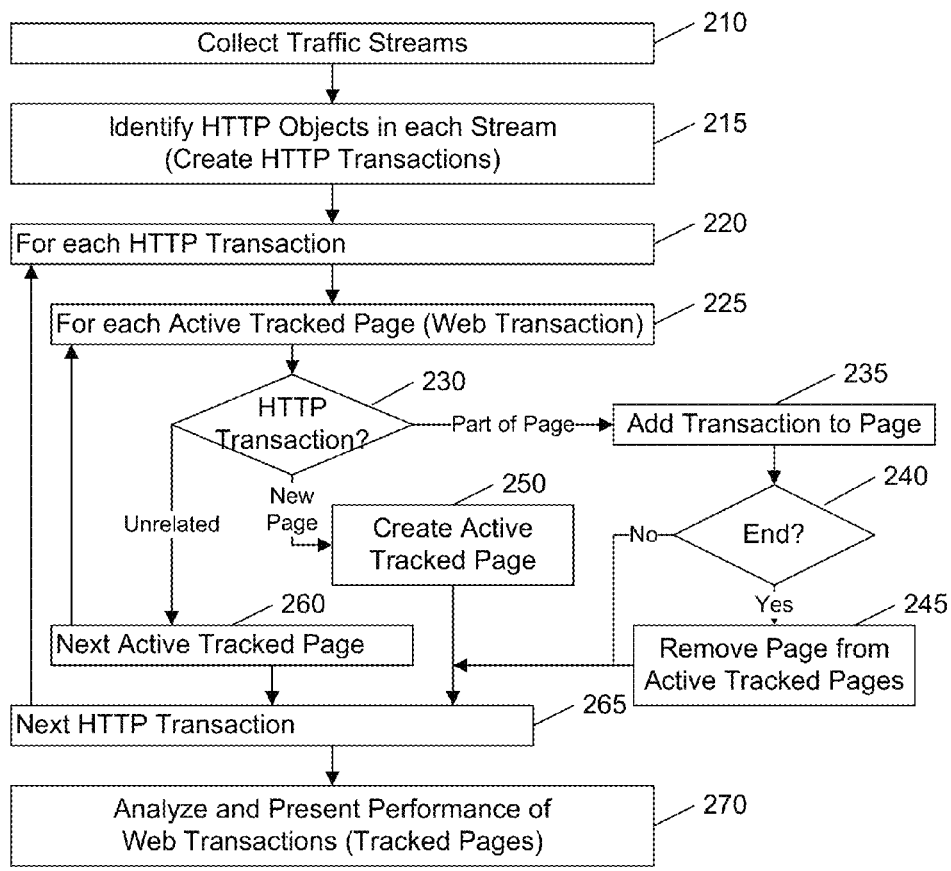
FIG. 2 illustrates an example flow diagram for performing web transaction analysis.

FIG. 2 illustrates an example flow diagram for performing web transaction analysis in accordance with aspects of this invention.

At 210, network traffic is collected, using conventional traffic monitoring devices such as 'sniffers' and the like. Preferably, characteristics associated with each message (e.g. packet) are stored as trace objects in a trace file, including, for example, the source and destination addresses, the time of arrival of the message at the monitoring device, the size of the message, the type of the message, and so on. Additionally, the trace object may include some or all of the content of the message.

As is known in the art, most traffic monitoring devices allow the user or network administrator to selectively filter the monitored traffic to store only traffic that is expected to be of interest, such as traffic to or from a particular address or set of addresses, and to store selected characteristics and/or selected portions of each filtered message. Additionally, the creation of trace objects may be triggered based on particular identified events. For example, the monitoring system could be configured to disable creation of trace objects until the occurrence of an HTTP GET command, at which point the system commences to create trace objects until a corresponding response is detected, or until a certain period of time has elapsed.

The collected network traffic is subsequently processed to identify traffic streams, that is, to identify a set of trace objects of messages corresponding to a particular transaction or conversation. As noted above, USPA 2007/0047438 identifies techniques for identifying traffic streams, although other techniques are common in the art. One of skill in the art will recognize that this processing may also include filtering to exclude streams that are not relevant to the current task. For example, the identified streams for this application may only include streams that include particular HTTP commands, or sets of HTTP commands. The creation/storage of each stream will include a means for accessing the stored information associated with each of the trace objects within the stream, using, for example, a sequence of pointers to these objects.

If multiple collection devices may have been used, the creation of each stream will also include a synchronization of the different times used by these different devices. USPA 2005/0030979, "SYNCHRONIZING PACKET TRACES", published 10 Feb. 2005 for Malloy et al. and incorporated by reference herein, discloses techniques for performing such time synchronization, although other techniques may be used. Typically, the time synchronization provides an 'offset' that should be applied to each of the message times based on which device collected the message; this offset is typically a time constant associated with each collection device, although a time function may also be provided to compensate for a particular device's clock 'drift', if any.

At 215, each identified stream is processed to identify key 'HTTP Objects' that facilitate subsequent analysis. These HTTP objects include, for example:

1. HTTP Request object—created when the trace object identifies an HTTP request (such as a GET).
2. HTTP Response-Start object—created when the trace object identifies an HTTP response; typically, the time that the HTTP response header is fully received is considered to be the response start time.
3. HTTP Response-End object—created when the trace object identifies that an HTTP response has been completely received, or has been abandoned.
4. HTTP Connection Close object—created at the end of the stream, or when the trace object identifies an explicit connection close, or a time-out.

These objects include a variety of fields, including, but not limited to:
  Connection Identifier;
  Monitor Identifier;
  Message Identifier;
  Message Start and End Time;
  Source and Destination Addresses;
  HTTP Fields:
  Response Code,
  Referrer,
  Location,
  User Agent,
  Server,
  Cookies,
  Content Type,
  Content Size/Length.

Other fields and objects may be created as well, depending upon the functions that are expected to be performed during the web transaction analysis. For example, HTTP POST messages may be stored to facilitate the identification of possible additional meta-data, such as session information or user login information.

As noted above, these objects are created to facilitate subsequent web transaction analysis. However, one of skill in the art will recognize that these objects may be implicitly created as the streams are processed during the transaction analysis. That is, preprocessing the streams to explicitly distinguish HTTP objects at 215 is functionally equivalent to distinguishing these HTTP objects by processing the stream of trace objects directly during the transaction analysis, but is likely to be more efficient, and to improve the overall performance of the system.

For ease of reference and understanding, the processing is presented hereinafter using the paradigm of a system that preprocesses the streams of trace objects to create streams of HTTP objects (HTTP transactions) that are subsequently processed to determine which HTTP transactions are associated with particular web pages of interest.

Each HTTP transaction (stream of HTTP objects) is processed via the loop 220-265. This processing will identify the start of a new page of interest, hereinafter a 'tracked page', as detailed further below. Each HTTP transaction is assessed to determine whether it is associated with any of the currently identified tracked pages or whether it starts a new tracked page, via the loop 225-260. If there are no currently identified pages, the HTTP transaction enters the loop 225-260 at least once to determine whether the transaction identifies a new page of interest.

At 230, the HTTP transaction is analyzed to determine whether it is associated with the tracked page currently identified by the loop 225-260, whether it is a new page to be tracked, or neither. As discussed above, each HTTP transaction is generally structured as an independent transaction on the network, and even if the transaction includes a reference to a particular web page (e.g. HTTP Referrer field), it is not readily apparent whether this transaction was initiated during the download of the web page, or was initiated by the user 'clicking' on an object on the page after the object was download. In assessing the performance of a web transaction, such as the download of a selected web-page, it is important to distinguish the HTTP transactions that are parts of the web transaction, such as those HTTP transactions 'caused' by the selection of the web-page, as compared to HTTP transactions that do not automatically occur when the web-page is selected. A user's selection of an object on a web-page is not, per se, 'caused' by the prior selection of the web-page for downloading; the time required to download the selected object (typically another web-page) is independent of the time to download the original web-page, and should be assessed independently.

In a preferred embodiment, because there are no 'hard and fast' rules for determining which HTTP transactions are parts of a common web transaction, 'heuristics' are used to perform this determination. As the term is used in the art, heuristics generally refer to 'experience-based' techniques for problem solving, and include such techniques as 'rule of thumb', 'educated guess', 'intuitive judgment' and 'common sense'. In more precise terms, heuristics generally "stand for strategies using readily accessible, though loosely applicable, information to control problem solving in human beings and machines"[1]. In embodiments of this invention, heuristics control problem solving in machines, and the readily accessible, though loosely applicable, information includes the content of the HTTP transactions, coupled with rules of thumb that are formulated with regard to the 'typical' characteristics of HTTP transactions that are part of a common Web transaction.

[1] Pearl, Judea (1983). Heuristics: Intelligent Search Strategies for Computer Problem Solving. New York, Addison-Wesley, p. vii.

If, based on these heuristics, at 230, it is determined that the HTTP transaction is a part of the tracked page (web transaction) that is currently being processed in the loop 225-260, the HTTP transaction is added to the tracked page, at 235. That is, the HTTP transaction is identified as being part of the tracked page for the purposes of defining and analyzing the web transaction.

After adding the HTTP transaction to the web transaction, the HTTP transaction is assessed to determine whether it signaled the end of the web transaction, at 240. If so, the web transaction is removed from the list of active/open web transactions for the purposes of identifying further HTTP transactions within the web transaction. In this example, the current page is removed from the list of active tracked pages that controls the loop 225-260.

Although not illustrated in FIG. 2, a web transaction may also be removed from the list of active web transactions if the time of the HTTP transaction currently being processed in the loop 220 is well beyond the time of the last HTTP transaction associated with the web transaction. That is, in some cases, such as an abnormal termination of the web transaction connection, an explicit HTTP end transaction may not be present in the collected HTTP transactions. In that case, after some defined inactive time period, the web transaction can be considered to have been closed, and it is removed from the list of active/open web transactions. In this example, the current page would be removed from the list of active tracked pages that controls the loop 225-260.

If, also based on the heuristics, at 230, it is determined that the HTTP transaction is the start of a new web transaction, a new web transaction is identified, at 250. In this example, a new page is created in the list of active tracked pages that controls the loop 225-260. As discussed further below, the characteristics of the HTTP transaction that starts a new web transaction are used as the characteristics for comparison with further HTTP transactions at 230.

Although not illustrated in FIG. 2, the process at 250 may be configured to only add new web transactions that are of interest within the current scope of the desired analysis. For example, if the analysis is intended to address the performance of particular web pages, and not the pages subsequently selected by the receiver of these web pages, such subsequently selected web pages will be identified as a new web transaction, at 230, but not added to the list of active web transactions (tracked pages), at 250.

Once an HTTP transaction is identified, at 230, as being part of an existing web transaction or the start of a new web transaction, and is processed via 235-250, there is no need to compare the HTTP transaction to other web transactions; accordingly, the loop 225-260 is exited for this HTTP transaction and the above comparison process is repeated for the next HTTP transaction, at 265.

If, at 230, the HTTP transaction has been identified as being unrelated to the current web transaction being analyzed in the loop 225-260, and not the start of a new web transaction, the next web transaction (tracked page) in the list of currently active/open web transactions (tracked pages) is identified, at 260, and the HTTP transaction is compared to this next web transaction via the loop 225-260. If there are no further active web transactions, the above comparison process is repeated for the next HTTP Transaction, at 265.

At the completion of the assessment of each HTTP transaction via the loop 220-265, all of the web transactions of interest will have been identified, along with other HTTP transactions, if any, that are part of each of these web transactions of interest. Any HTTP transaction that was not a start of, or a part of, a web transaction of interest is not passed on for subsequent analysis.

At 270, each web transaction of interest is analyzed, and the result of this analysis is presented to the user of the web transaction analysis system, as detailed further below.

Figure 3:
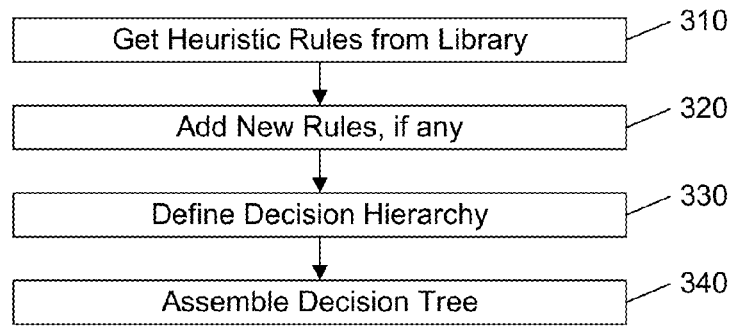
FIG. 3 illustrates an example flow diagram for creating a decision tree.

In an embodiment of this invention, the web transactions are assessed using heuristics that are arranged in a decision tree. FIG. 3 illustrates an example flow diagram for creating such a decision tree.

As detailed below, a number of heuristics can be defined to determine whether an HTTP transaction is likely to be part of a given web transactions, or the start of a new web transaction, based on general principles. Preferably, such heuristics are stored in a library. At 310, these heuristics are retrieved from the library, and at 320, the user is provided the opportunity to add additional heuristics, or omit one or more of the existing heuristics, to customize the analysis for the particular set of web transactions of interest.

The heuristics are generally arranged in a decision hierarchy. That is, some heuristics are 'stronger' than others with respect to determining the likelihood that an HTTP transaction is related to a given web transaction. If one or more of these stronger heuristics provide a particular indication, there will often be no need to process the weaker heuristics. For example, certain heuristics, such as detection of invalid request methods, irrelevant response codes, empty objects, known browser behavior, etc. are rules that are generally clear-cut cases where an object can be determined not to be part of the web transaction. These rules preferably have priority over other heuristics in the system.

The relative strength, or priority, of the heuristics may be dependent upon the particular situation being assessed, and at 330, the user is also provided the opportunity to modify this hierarchy.

At 340, a decision tree is defined, based on the particular heuristics being applied, and the aforementioned decision hierarchy. As the term is used herein, a decision tree is a defined sequence that is applied to process the heuristics. Preferably, a default decision tree is provided with the default heuristics in the library, and the user is provided the option of modifying this decision tree. As noted above, the stronger heuristics are generally processed first, to see if a decision can be made quickly and/or definitively. If a decision cannot be made based on the stronger heuristics, the decision tree leads to the processing of the weaker heuristics until a decision can be made, or until all of the heuristics are processed.

Generally, in evaluating the disposition of objects and their relationship to the web transaction, the heuristics of the system are interrelated and several heuristic matches must be made before a final decision can be made about an object. For example, two objects loaded on the same TCP connection are likely to be related, but if those objects are both objects that are likely to start a page (e.g., html objects) and contain Referrers that don't match, those objects are split into separate web transactions despite being on the same TCP connection. The decision tree will be structured to accommodate these interrelationships and dependencies.

One of skill in the art will recognize that other techniques may be used to assess whether an HTTP transaction is part of a given web transaction. For example, the results of a set of comparisons and characterizations of the HTTP transaction with respect to the web transaction may be provided to a neural network that is trained using example web transactions, the choice of comparisons and characterizations being based on a set of heuristics.

Figure 4:
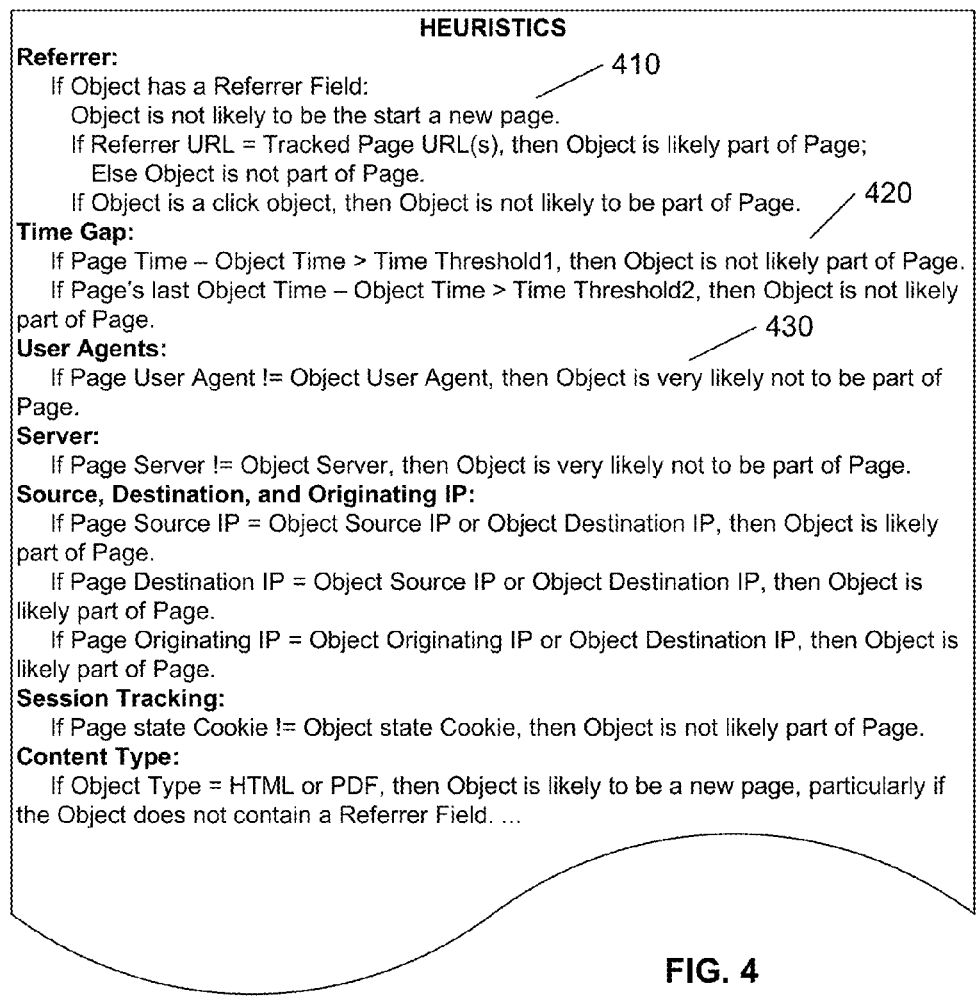
FIG. 4 illustrates an example set of heuristics.

FIG. 4 illustrates an example set of heuristics. These heuristics are based on the aforementioned fields that may be present within the identified objects of the HTTP transaction that is being assessed and objects within the HTTP transaction that characterizes the web transaction of interest, typically the HTTP transaction that starts the download of a web page of interest. Of particular note, an HTTP transaction may or may not contain particular fields, and the assessment of an HTTP transaction will be dependent on whether the field exists, and if so, the contents of the field. For ease of reference, the term 'object' is used in FIG. 4 to indicate the element in the HTTP transaction that is currently being assessed, and the term 'page' is used to indicate the element in the web transaction to which the HTTP transaction is being compared.

The first set of example heuristics 410 in FIG. 4 relate to the Referrer field of the object in the HTTP transaction. The Referrer field, if present, identifies an address that led to a request for the current object. An identification of the web page of interest may be placed in the Referrer field of the object request as the page is being processed by the browser that initiates the request. However, this same identification may be placed in the Referrer field of an object request when the user independently clicks on an identifier of the object within the web page of interest.

If the object has a referrer field, the content of the referrer field is compared to the web page of interest. The web page of interest may have multiple addresses (URLs) associated with it, particularly if the web page contains nested objects (i.e. objects that include objects). As each HTTP transaction is determined to be part of a particular web transaction, the appropriate URLs associated with the HTTP transaction are added to a list of addresses associated with the web page. For example, if the HTTP request includes a Location field, indicating a redirect to another URL, that URL is added to the list of URLs associated with the web transaction.

If the content of the referrer field does not match any of the URLs associated with the web page of interest, the object is unlikely to be a part of that web page. On the other hand, if the object's referrer field corresponds to one of the URLs of the web page, it is more likely that the object is a part of the web page and several additional heuristics may be evaluated to confirm that association. For example, if the object is identifiable as a click object, then it may have been 'caused' by the download of the web page or it may have been 'caused' by a click on the web page. The Content-Type of the object and/or the timing of the object relative to the other web page components may then be utilized to determine the more likely scenario.

Other heuristics can be defined that relate to the Referrer field, or a combination of the Referrer field and other fields. For example, if the Content Type field indicates that the object is an image, and the Referrer field does not correspond to any of the URLs associated with the web page, then the likelihood that the object is part of the web page is extremely low.

The second set of heuristics 420 relate to the time that the object is captured, compared to the time(s) associated with the web transaction. Presumably, a web browser will process the web page soon after it is received, and will initiate the HTTP requests for the objects on the web page within a relatively short period of time. If the duration between the time that the web page is captured and the time that the object is captured exceeds a given threshold, it is unlikely that the object is part of the web page. In some cases, particularly with nested objects, however, the browser must wait until a first object is received before it can request a second object. To accommodate this possibility, the time of capture of the current object is compared to the time of capture of the last HTTP transaction that has been determined to be part of the web page.

Although the heuristics 420 are structured as a comparison of times to a set of thresholds, one of skill in the art will recognize that other techniques may be used. For example, the likelihood of being part of the web page could be defined, for this heuristic, as being inversely proportional to the duration between the times of capture. Similarly, the likelihood could be dependent on the duration between the times of capture as well as the Content Type, or Content Size. For example, if a large image is requested from a server, it may take the server longer to prepare the object for downloading than it would to prepare a pdf or html object.

Note that the heuristics in FIG. 4 are expressed 'in prose', for ease of understanding. For example, the heuristics 410, 420 use the terms 'likely' and 'unlikely', whereas the heuristic 430 uses the term 'very unlikely'. One of skill in the art will recognize that in an embodiment of this invention these heuristics will generally include some quantifiable measure of the likelihood that a particular object is part of the page of interest. For example, each heuristic could assign some positive or negative value to a likelihood measure, and the processing of the heuristics for a particular HTTP transaction could terminate with a decision when the cumulative likelihood measure exceeds some threshold in either direction. Similarly, a combination of values and weights could be used, the values representing a likelihood measure, and the weights representing a 'confidence' measure that is associated with this likelihood measure. These and other techniques, often referred to as techniques that employ 'fuzzy logic' or 'expert systems', are common in the art.

Other Common Heuristics Include:

User Agents and Server: If either the User Agent or Server indicate a mismatch between the object and the web page, it is very unlikely that the object is part of the page.

Source and Destination IPs: Objects appearing on the same TCP connection are more likely to be related.

Originating IP address: When HTTP traffic is sent through a proxy the proxy may add a header specifying what the Originating IP address is. This can be used to associate an object, much like using TCP Source and Destination addresses.

Session tracking via cookies: A session state that is maintained in cookies can be used to correlate two objects. Objects with state information that doesn't match can be separated into different pages.

Content-type of the response: Objects of certain content type, such as HTML and PDF are more likely to be lead objects that start a page rather than constituent objects, and timing gaps can be adjusted to accommodate for user clicking times.

Request extension type: If the content-type is falsely reported in the content-type header or if the content-type header is not available, the content type of the object can be extrapolated from the file extension of the object's URL.

Monitoring interface: Objects appearing on a monitoring system's interfaces may appear on different interfaces. This can be used to separate or join objects.

Completeness of the response (abandonment): Objects that do not completely load are unlikely to start a page and can cause other objects to be falsely associated with the parent page. This can be mitigated by detecting incomplete object requests.

Concurrently loading objects: A page that's in the process of being loaded will have multiple objects being requested simultaneously. Thus, objects being loaded at the same time are more likely to be associated with one another.

HTTP response codes: When objects are returned with certain HTTP response codes, such as "204 (No Content)," they can be discarded since they are unlikely to start a page.

Known browser behavior (e.g. favicon, robots): Certain known browser behavior, such as requests for favicons, can be factored into the object association logic by discarding such objects (since they are not inherently part of a page). Also, detection of robots via User-Agent can be used to either discard an object or adjust time gap thresholds.

User-provided guidance: End users can provide feedback to the system via the UI by indicating that they "like" the way certain pages appear or "dislike" the way certain pages appear. This information can then be used in future decisions to prevent or force certain objects to start a page.

In a preferred embodiment of this invention, the analysis system is configured to recognize anomalous behavior and adjust accordingly. For example, one would expect to capture HTTP transactions from a fairly random assortment of client addresses. If, on the other hand, one address stands out as having issued an inordinately large number of HTTP transactions, this may be an indication that multiple clients are connecting through a Network Address Translator (NAT) or through a proxy.

If anomalous behavior is observed, the system preferably modifies the analysis process to accommodate this behavior. For example, if the use of an address translator is detected, the system may modify the heuristic hierarchy, with a corresponding change to the decision tree, to degrade the strength of heuristics based on source or destination IP addresses, or to upgrade the strength of heuristics based on session tracking via cookies. Alternatively, or in combination, if weights are used to indicate confidence, the weight associated with the source and destination IP address heuristics may be decreased while the weight associated with the session tracking via cookies heuristics may be increased. In like manner, if it is detected that a user is using privacy software to block the Referrer field, the Referrer heuristics may be degraded or completely ignored.

As noted above, when a determination is made that the HTTP transaction is part of the web transaction, the HTTP transaction, and its characteristics, are added to the record of the web transaction for further processing. If the determination is ambiguous, a number of options are available. In a simple embodiment, a default choice (part/not part) can be defined for disambiguating the determination based on a threshold parameter. This threshold parameter may be user controllable, depending on whether the user wants to err on the side of including unrelated HTTP transactions, or excluding related HTTP transactions. In a more complex embodiment, ambiguous transactions may be marked as such, and the subsequent analysis may be configured to provide min-max statistics based on the exclusion or inclusion of these transactions. Preferably, the user is also provided the option of excluding or including particular HTTP transactions.

As indicated in the flow diagram of FIG. 2, after the records of the web transactions of interest are updated to identify the HTTP transactions that are part of the web transactions, the parameters and characteristics associated with these transactions, such as the timing of the page, throughput of the page, a count of objects, and a summary of HTTP result codes, are processed to determine the performance characteristics associated with each web transaction, such as page size, download time, number of downloads, number of incomplete downloads, and so on. In a preferred embodiment, the HTTP transaction data is rolled up into aggregations based on the throughput measurements and the page load time measurements. This rollup is used to summarize the data for quick retrieval, and to limit the amount of data that needs to be stored.

FIG. 5 illustrates an example presentation of the results of such an analysis.

Of particular note, pages are organized by 'page families' 510. A particular URL may contain multiple parameters, and these parameters can overwhelm or confuse a user examining the output. To form a page family, the URLs are trimmed based on certain rules. The primary rule is to remove the parameters from the URL. For very long URLs without parameters, the URL is trimmed to a certain byte length, or the URL is trimmed to include a fixed hierarchical level, as indicated by the number of slashes in the URL. That is, by trimming the URL, the abbreviated URL will generally reflect an organization structure, a file hierarchy, and so on.

The details related to each page family is stored, in order to keep track of as many full URLs as possible, so that when a user examines a page family, the user can see the members of that family to identify the objects that are included within the URL, as well as the parameters of the URL. Other data can also be added to the data stored for each URL, such as the full headers for each object, some or all of the fields, and so on. Using this data, the presentation interface can provide comprehensive debugging capability to tune the stitching algorithms or to provide Gantt charts to show how the objects constitute a page.

For each page family, the performance data is presented. Example performance data includes the number of page views 520, the page view rate (views per minute) 530, the percentage of 'slow' pages (as defined by some user-defined criteria) 540, the percentage of bad HTTP requests 550, the average page size 560, and the average page download time 570.

It should be noted that in a preferred embodiment of this invention, security measures are taken to prevent the disclosure of private information. URLs and headers may contain sensitive information that needs to remain private, especially when SSL decoding is used. That is, for example, a provider of a web server may provide an SSL decrypting key to facilitate the performance analysis, but the decrypted data should not be made available to the user of the analysis system. In a preferred embodiment, such private data is masked before it is presented to the user or written to disk. Sensitive form values, cookies data, and URL parameters are identified by the organization for which the analysis is being performed, and these values are The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may include a processor, and software portions may be stored on a non-transient computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of an element includes two or more of the claimed element, and does not imply any particular range of number of elements; that is, a plurality of elements can be as few as two elements, and can include an immeasurable number of elements.

The invention claimed is:

1. A method comprising:
receiving a plurality of traffic streams captured by one or more network monitors, each traffic stream including messages between elements other than the network monitors,
parsing the messages of each traffic stream into a plurality of HTTP objects,
identifying a page object in the plurality of HTTP objects,
identifying one or more page elements in the plurality of HTTP objects that are associated with the page object,
distinguishing first page elements that are associated with a download of the page object by a user, and second page elements that are associated with a subsequent action of the user,
determining first performance parameters associated with the page object based on characteristics of the first page elements,
determining second performance parameters associated with the page object based on characteristics of the second page elements, and
providing a display based on at least one of the first and second performance parameters.

2. The method of claim 1, wherein the subsequent action of the user includes a selection of an option provided by the page object.

3. The method of claim 2, wherein the option includes a download of an other page object, the second page elements being associated with the other page object.

4. The method of claim 1, wherein the first performance parameters include at least one of a page size and a download time.

5. The method of claim 1, wherein the first performance parameters include at least one of a number of completed downloads and a number of uncompleted downloads.

6. The method of claim 1, wherein distinguishing the first and second page elements includes assessing the page elements based on a set of heuristics pertaining to attributes of the page elements.

7. The method of claim 6, the set of heuristics pertain to attributes of the HTTP objects.

8. The method of claim 7, wherein the attributes of the HTTP objects include at least one of: an HTTP referrer field, an HTTP location field, an HTTP user agent field.

9. The method of claim 7, wherein the attributes of the HTTP objects include at least one of: a time, one or more address fields, one or more cookies, and a content type associated with the HTTP object.

10. The method of claim 6, wherein distinguishing the one or more page elements includes using one or more decision trees that control a sequence of assessments based on the set of heuristics.

11. A system comprising:
a transaction identifier that is configured to:
receive a plurality of traffic streams captured by one or more network monitors, each traffic stream including messages between elements other than the network monitors,
parse the messages of each traffic stream into a plurality of HTTP objects, and
identify a page object in the plurality of HTTP objects,
a page stitcher that is configured to distinguish at least first page elements and second page elements in the plurality of HTTP objects that are associated with the page object,
a performance analyzer that is configured to:
determine first performance parameters associated with the page object based on characteristics of the first page elements, and
determine second performance parameters associated with the page object based on characteristics of the second page elements, and
a user interface that is configured to provide a display based on at least one of the first and second performance parameters.

12. The system of claim 11, wherein the second page elements are associated with a subsequent user action while interacting with the page object.

13. The system of claim 12, wherein the subsequent user action includes a selection of an option provided by the page object.

14. The system of claim 13, wherein the option includes a download of an other page object, the second page elements being associated with the other page object.

15. The system of claim 11, wherein distinguishing the first and second page elements includes assessing the page elements based on a set of heuristics pertaining to HTTP attributes of the HTTP objects.

16. A non-transitory computer-readable medium that includes a program that, when executed by a processor, causes the processor to:
receive a plurality of traffic streams captured by one or more network monitors, each traffic stream including messages between elements other than the network monitors,
parse the messages of each traffic stream into a plurality of HTTP objects,
identify a page object in the plurality of HTTP objects,
distinguish at least first page elements and second page elements in the plurality of HTTP objects that are associated with the page object,
determine first performance parameters associated with the page object based on characteristics of the first page elements,
determine second performance parameters associated with the page object based on characteristics of the second page elements, and
provide a display based on at least one of the first and second performance parameters.

17. The medium of claim 16, wherein the second page elements are associated with a subsequent user action while interacting with the page object.

18. The medium of claim 17, wherein the subsequent user action includes a selection of an option provided by the page object.

19. The medium of claim 18, wherein the option includes a download of an other page object, the second page elements being associated with the other page object.

20. The medium of claim 16, wherein the program causes the processor to distinguish the first and second page elements via a process that includes assessing the page elements based on a set of heuristics pertaining to HTTP attributes of the HTTP objects.

* * * * *